US012786409B2

(12) United States Patent
Choi et al.

(10) Patent No.: US 12,786,409 B2
(45) Date of Patent: Nov. 3, 2026

(54) SELECTIVE TEMPORAL RESAMPLING ACTIVATION AT PICTURE LEVEL

(71) Applicant: InterDigital VC Holdings, Inc., Wilmington, DE (US)

(72) Inventors: Hyomin Choi, Sunnyvale, CA (US); Fabien Racape, San Francisco, CA (US); Syed Mateen Ul haq, Mountain View, CA (US)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 112 days.

(21) Appl. No.: 18/826,706

(22) Filed: Sep. 6, 2024

(65) Prior Publication Data

US 2026/0075204 A1 Mar. 12, 2026

(51) Int. Cl.
*H04N 19/132* (2014.01)
*H04N 19/70* (2014.01)

(52) U.S. Cl.
CPC ........... *H04N 19/132* (2014.11); *H04N 19/70* (2014.11)

(58) Field of Classification Search
CPC .... H04N 19/132; H04N 19/70; H04N 19/172; H04N 19/587
See application file for complete search history.

(56) References Cited

U.S. PATENT DOCUMENTS

2025/0080773 A1* 3/2025 Wenger ................ H04N 19/186

FOREIGN PATENT DOCUMENTS

WO WO-2025251103 A1 * 12/2025 ............ H04N 19/12

OTHER PUBLICATIONS

"Algorithm Description of FCTM" International Organization for Standardization, ISO/IEC JTC 1/SC 29/WG 04 N0498; MPEG Video Coding, Convenorship: CN, May 5, 2024, 21 pages.
Zhang et al. "[FCM] CE 2.3.1 Temporal resampling", Internation Organisation for Standardization, ISO/IEC JTC 1/SC 29/WG 4 m67615; MPEG Video Coding, Rennes, France, Apr. 2024, 11 pages.
"Preliminary WD of feature coding for machines", ISO/IEC JTC 1/SC 29/WG 4 N00517, Rennes, France, Apr. 2024, 25 pages.
Rosewarne et al., "Feature Coding for Machines BoG report", International Organization for Standardization, ISO/IEC JTC 1/SC 29/WG 4 m68109; MPEG Video Coding, Rennes, France, Apr. 2024, 22 pages.

(Continued)

*Primary Examiner* — Maria E Vazquez Colon
(74) *Attorney, Agent, or Firm* — VOLPE KOENIG

(57) ABSTRACT

In various implementations, method and devices are disclosed that encode or decode a set of feature tensors used in Video Coding for Machine as a sequence of images as addressed in Features Coding Machine. For instance, the decoding method comprises obtaining an indication for enabling of a temporal resampling of a set of feature tensors at sequence level; obtaining an indication for estimating an upsampled set of feature tensors at picture level; and decoding the sequence of images by selectively activating/deactivating upsampling a set of feature tensors based on the indications. According to different variant, the indication for estimating an upsampled set of feature tensors at picture level may be derived or parsed from a syntax element fpps_inactive_upsampling_flag signaled in a Feature Picture Parameter Set (FPPS).

20 Claims, 15 Drawing Sheets

(56) References Cited

OTHER PUBLICATIONS

Gao et al., "Recent Standard Development Activities on Video Coding for Machines", arXiv, May 26, 2021, 13 pages.
"Common test and training conditions for FCM", International Organization for Standardization, ISO/IEC JTC 1/SC 29/WG 04 N 0497; MPEG Video Coding, Rennes, France, Apr. 2024, 23 pages.
Choi et al., "[FCM][HLS] Selective temporal upsampling activation method", International Organisation for Standardisation, ISO/IEC JTC 1/SC 29/WG 4, MPEG Video Coding, ISO/IEC JTC 1/SC 29/WG 4, Document: m69884, Kemer, Turkey, Nov. 2024, 3 pages.
"Information technology—Artificial intelligence for multimedia—Part #: Feature coding for machines", ISO/IEC 23888-#: ####(X), ISO/IEC JTC 1/SC 29/WG 4, 2024, 27 pages.

* cited by examiner

1400

1500

SELECTIVE TEMPORAL RESAMPLING ACTIVATION AT PICTURE LEVEL

TECHNICAL FIELD

The present application is related to a method and an apparatus for encoding or decoding relative to Feature Coding for Machines.

BACKGROUND

The present application is related to split inference (also known as collaborative intelligence), i.e., accomplishing machine vision analytics such as classification, object detection, object tracking, etc., with split deep neural networks (DNN) that are physically apart from each other but communicating by transmitting intermediate data at a split point.

BRIEF SUMMARY

Briefly stated, in one embodiment, a method for video decoding is disclosed that comprises obtaining, an indication of an enabling of a temporal resampling of at least one set of feature tensors of a video sequence; obtaining an indication for estimating an upsampled set of feature tensors between a previous set of reconstructed feature tensors and a current set of reconstructed feature tensors; and decoding the at least one set of feature tensors of the video sequence based on the indication for estimating an upsampled set of feature tensors.

One or more embodiments also provide a method for video encoding comprising determining an indication of an enabling of a temporal resampling of at least one set of feature tensors of a video sequence; determining an indication for estimating an upsampled set of feature tensors between a previous set of reconstructed feature tensors and a current set of reconstructed feature tensors; and encoding the at least one set of feature tensors of the video sequence based on the indication for estimating an upsampled set of feature tensors.

One or more embodiments also provide an apparatus for encoding/decoding video comprising one or more processors and at least one memory coupled to said one or more processors, wherein said one or more processors are configured to perform the encoding/decoding method according to any of the embodiments described herein.

One or more embodiments also provide a computer program comprising instructions which when executed by one or more processors cause the one or more processors to perform the decoding/encoding method according to any of the embodiments described herein. One or more of the present embodiments also provide a computer readable storage medium having stored thereon instructions for encoding or decoding a video according to the methods described herein.

One or more embodiments also provide a computer readable storage medium having stored thereon video data generated according to the methods described above. One or more embodiments also provide a method and apparatus for transmitting or receiving the video data generated according to the methods described herein.

BRIEF DESCRIPTION OF THE DRAWINGS

The following detailed description will be better understood when read in conjunction with the appended drawings, in which there are shown examples of one or more of the multiple embodiments of the present disclosure. It should be understood, however, that the embodiments described herein are not limited to the precise arrangements and instrumentalities shown in the drawings. In the drawings.

DETAILED DESCRIPTION

Figure 1:
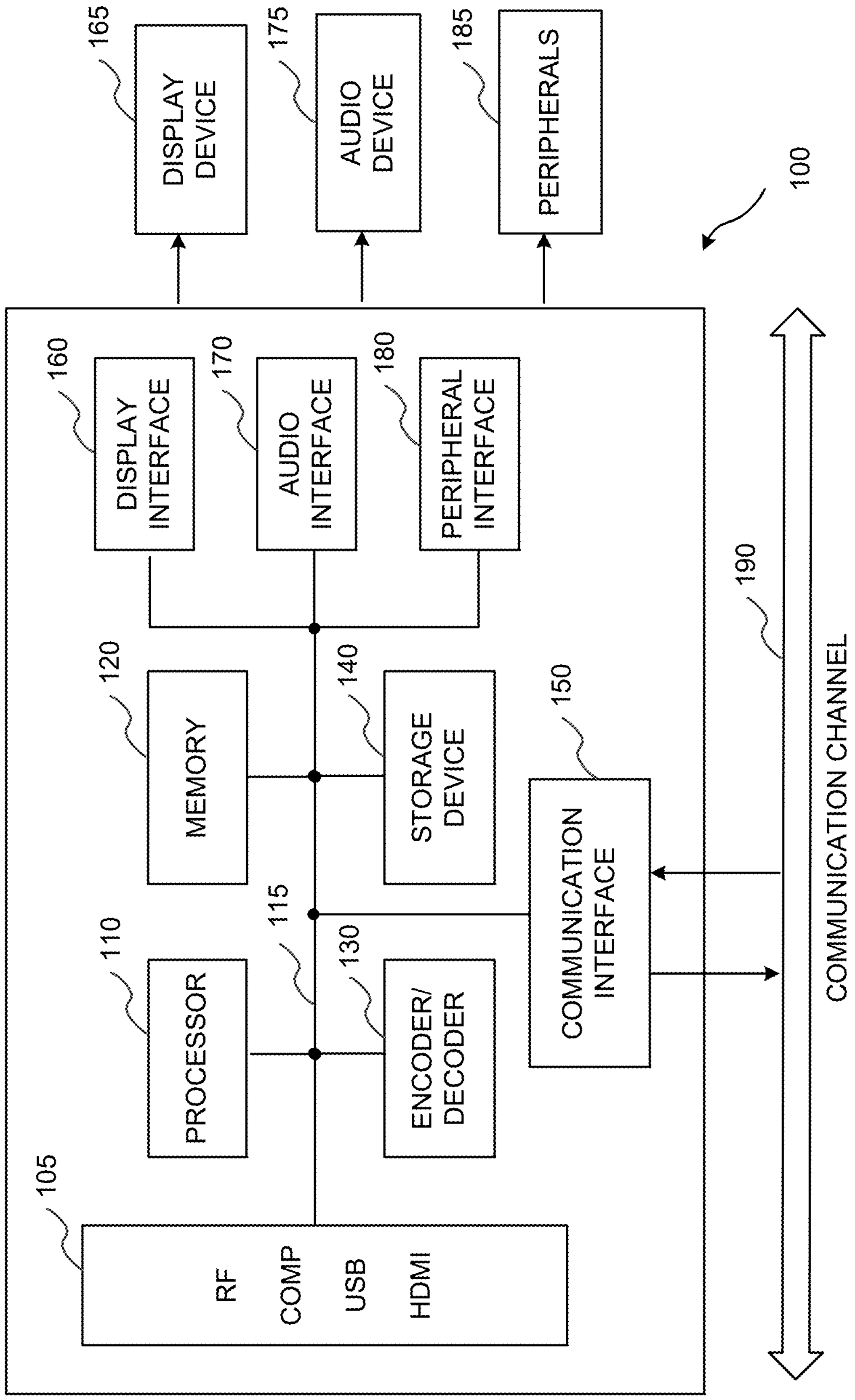
FIG. 1 illustrates a block diagram of a system within which aspects of the present embodiments may be implemented.

In describing the various embodiments of the present disclosure, certain terminology is used herein for convenience only and should not be considered as limiting such embodiments. In the drawings, the same reference numerals are employed for designating the same elements throughout the several figures and the present description.

Referring to the drawings, there is shown in FIG. 1 a block diagram of an example of a system in which various aspects and embodiments may be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, JPEG Pleno, MPEG-I, HEVC, VVC or MPEG VCM.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing. Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

With the rise of machine learning technologies for vision applications in domains like intelligent transportation, smart cities, intelligent content management, etc., the amount of video and images consumed by machines is rapidly increasing. In many cases, these vision tasks demand heavy computations and need to be performed on cloud systems, rather than the limited devices capturing the source content, which requires the transmitting the video content. Like for traditional video transmission pipelines, the amount of source data requires performance compression to fit physical bandwidth and storage capacities. Currently deployed methods rely on existing image and video codecs which were designed for human consumption. However, machine vision algorithms are not sensitive to the same artifacts when applying lossy compression.

Figure 2:
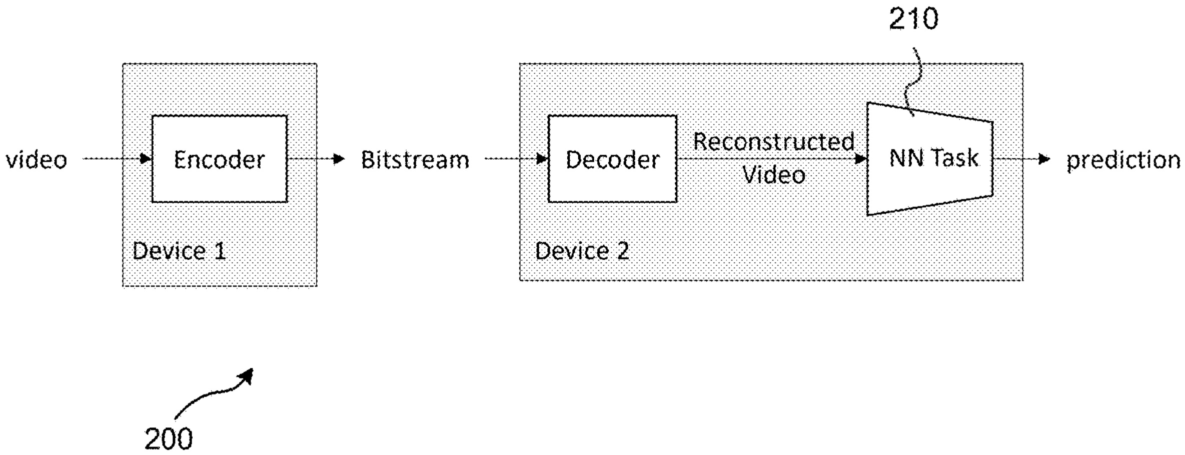
FIG. 2 illustrates a block diagram of a pipeline considered for Video Coding for Machines (VCM) within which aspects of the present embodiments may be implemented.

FIG. 2 illustrates a block diagram of a pipeline considered for Video Coding for Machines (VCM) within which aspects of the present embodiments may be implemented. A first step in enabling efficient remote analysis consists in compressing the source videos using methods that are optimized for downstream vision tasks 210, rather than for human vision. The framework 200 of FIG. 2 has been named Video Coding for Machines (VCM) in the context of the standardization activities at MPEG/ISO. For instance, the document "Recent Standard Development Activities on Video Coding for Machines" by W. Gao et al. describes the latest developments of Video Coding for Machines in standardization activities at MPEG/ISO. For the sake of conciseness, in the following, the term video will be used for both image and video content.

Figure 3:
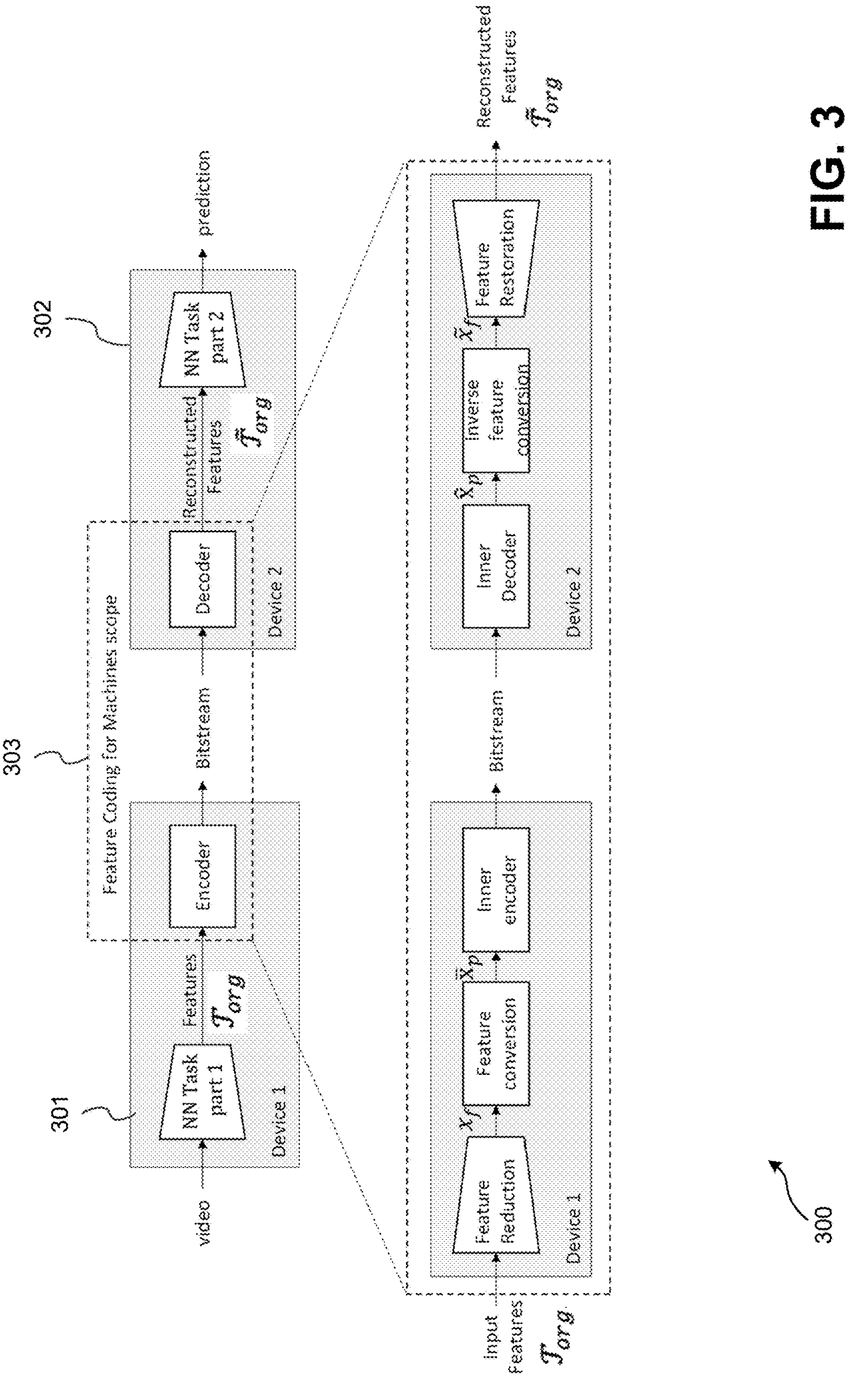
FIG. 3 illustrates a block diagram of a pipeline considered for Feature Coding for Machines (FCM) within which aspects of the present embodiments may be implemented.

FIG. 3 illustrates a block diagram of a pipeline considered for Feature Coding for Machines (FCM) within which aspects of the present embodiments may be implemented. The framework 300 of FIG. 3 consists of two parts of the split DNN model, NN Task Part 1 and NN Task Part2. Supposedly those two parts are run on different devices, e.g., NN Task Part 1 on a phone or camera 301 and NN Task Part 2 on the network or cloud 302. Such splitting of the model may be used to offload some of the computations when the device that captures or contains the source content is limited in terms of processing, memory, energy, etc. It may also be useful to transmit such features while protecting the privacy of the original content since the original pixels are not directly coded. In this context, at the split point, intermediate data or features need to be transmitted to the remote machine 302 to perform the second part of the model inference.

The device 301 containing the source video performs NN Task Part 1 to extract features $\mathcal{T}_{org}$ . These features are then transmitted to and analyzed remotely by the device 302 performing NN Task Part 2. The size of the feature tensor(s), usually 3-dimension tensors, maybe be greater than input data (e.g., image or video) volume. It is then necessary to introduce a codec to efficiently reduce the size of transmitted data. Because conventional standard video codecs are optimized for human consumption, and not necessarily efficient to compress the extracted intermediate large 3D feature tensors, another MPEG standardization initiative related to Feature Coding for Machines (FCM) is directed at providing suitable compression methods for the intermediate feature tensors in the context of split inference scenario.

The zoomed-in dashed block 303 in FIG. 3, which represents the FCM scope, i.e., feature encoding and decoding, details the compression modules composing the latest MPEG FCM coding pipeline. To compress the input features $$\mathcal{T}_{org} = \{T_{org}^1, T_{org}^2, \ldots, T_{org}^L\},$$

where L is the number of feature tensors at a split point, a current version of the FCM employs learned shallow neural networks (NNs) taking a set of the feature tensors in 3D as input from a split point and outputting a single tensor with much smaller data volume. Thus, the single tensor $x_f$ is quantized with uniform scalar and tiled into a frame $\bar{x}_p$ to feed into the inner codec (i.e., conventional 2D video codec like H.265/HEVC and H.266/VVC). On the remote server, the tiled frames $\hat{x}_p$ are reconstructed from the bitstream, then are inverted to the shape of tensor in 3D followed by inverse quantization process. A learned shallow NN takes the reconstructed tensor $\tilde{x}_f$ as input to restore the full size of original feature tensor. Hence, the reconstructed feature tensors with original dimension $\tilde{\mathcal{T}}_{org}$ are fed into the NN Task Part 2 to accomplish the inference.

The present principles assume that, in most cases, the pre-trained NN-task-part-1 and NN-task-part-2 were not trained with a constraint on the size and entropy of the intermediate features $\mathcal{T}_{org}$. Unlike auto-encoders that introduce information bottleneck to properly train a network with respect to both reconstruction quality and bitrate, computer vision algorithms are trained to maximize the accuracy only in many use cases. In other words, each feature map computed through learned computer vision network contributes only to the end accuracy, whatever their coding cost.

Figure 4:
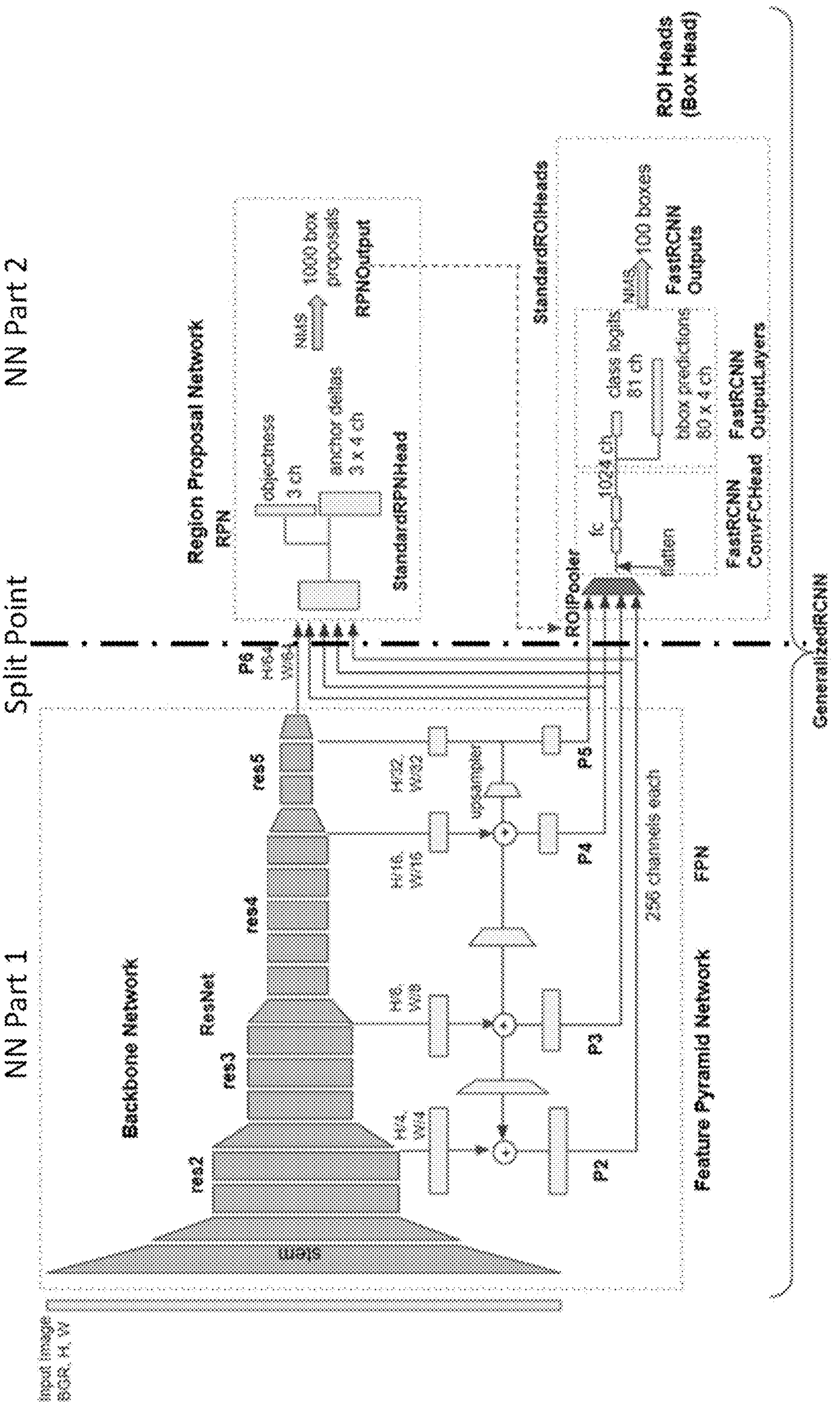
FIG. 4 illustrates a block diagram of the Faster-RCNN under consideration at the MPEG FCM within which aspects of the present embodiments may be implemented.

FIG. 4 illustrates a block diagram of the Faster-RCNN under consideration at the MPEG FCM within which aspects of the present embodiments may be implemented. The model contains a backbone that generate feature tensors of different sizes P2, P3, P4, P5, P6, that are then analyzed for tasks such as object detection and segmentation. In the split-inference context studied here, a split point separates NN-part-1 and NN-part-2 as in FIG. 3. The encoded and transmitted data corresponds to tensors $$\mathcal{T}_{org} = \{T^1_{org}, T^2_{org}, T^3_{org}, T^4_{org}\}$$

of FIG. 3 and are referred to as {P2, P3, P4, P5} on FIG. 4.

Figure 5:
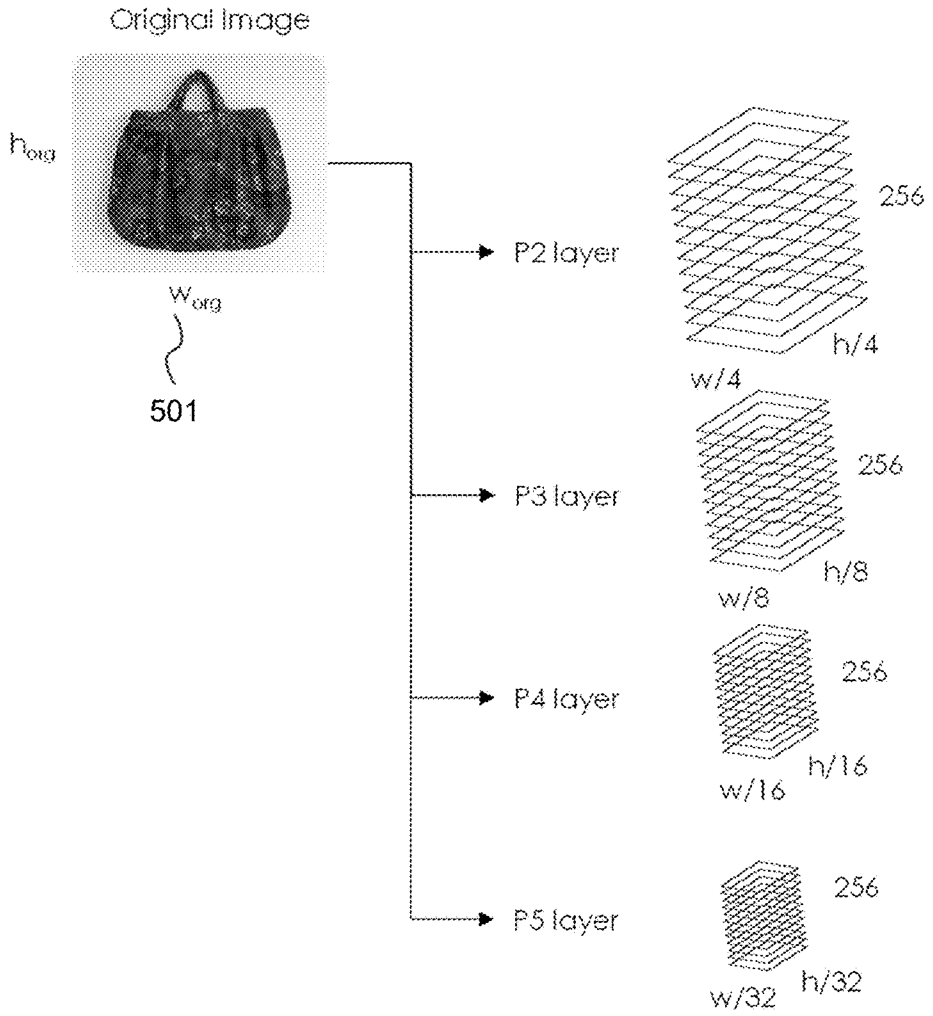
FIG. 5 illustrates an example of the shapes of the tensors to transmit in FCM.

FIG. 5 illustrates an example of the shapes of these tensors to transmit. The tensors contain 256 channels for each input image 501, and different resolutions depending on the input resolution (the input resolution to the model is different from the original image size $w_{org} \times h_{org}$ due to rescaling and padding operations).

Figure 6:
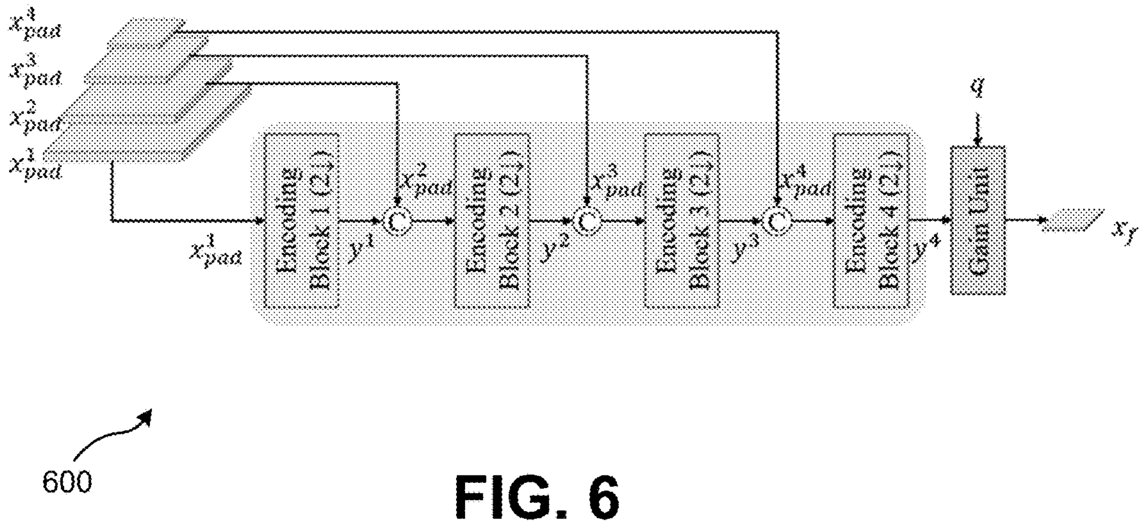
FIG. 6 illustrates a block diagram of a shallow network architecture for feature reduction module interfacing with Faster R-CNN at Feature Pyramid Network outputs.

FIG. 6 illustrates a block diagram of a shallow network architecture 600 for feature reduction module interfacing with Faster R-CNN at Feature Pyramid Network outputs. With the latest development of FCTM, the software FCM Test Model, the extracted feature tensors out of the NN Part 1 in Faster R-CNN are fed into the feature reduction model shown in FIG. 6, where P2, P3, P4, P5 may be represented by $$x^1_{pad}, x^2_{pad}, x^3_{pad}, x^4_{pad},$$

respectively. Because of spatial shift by nature of the convolution operation, each original feature tensor is properly padded before applying the convolutional layers. In FIG. 6, the set of feature tensors is converted into a single feature tensor with 320 channels $y^4$ using convolutional layers with learned weights. Then a Gain Unit adjusts the scales of the feature tensor $y^4$ by multiplying each channel by a one of the 8 learned candidate vectors and outputs the reduced feature tensor $x_f \in \mathbb{R}^{C_f \times H_f \times W_f}$ where $C_f=320$ and $H_f \times W_f$ is the spatial resolution of the feature tensor. The index of the vector, q, as input to the Gain Unit can be heuristically selected or fixed.

Figure 7:
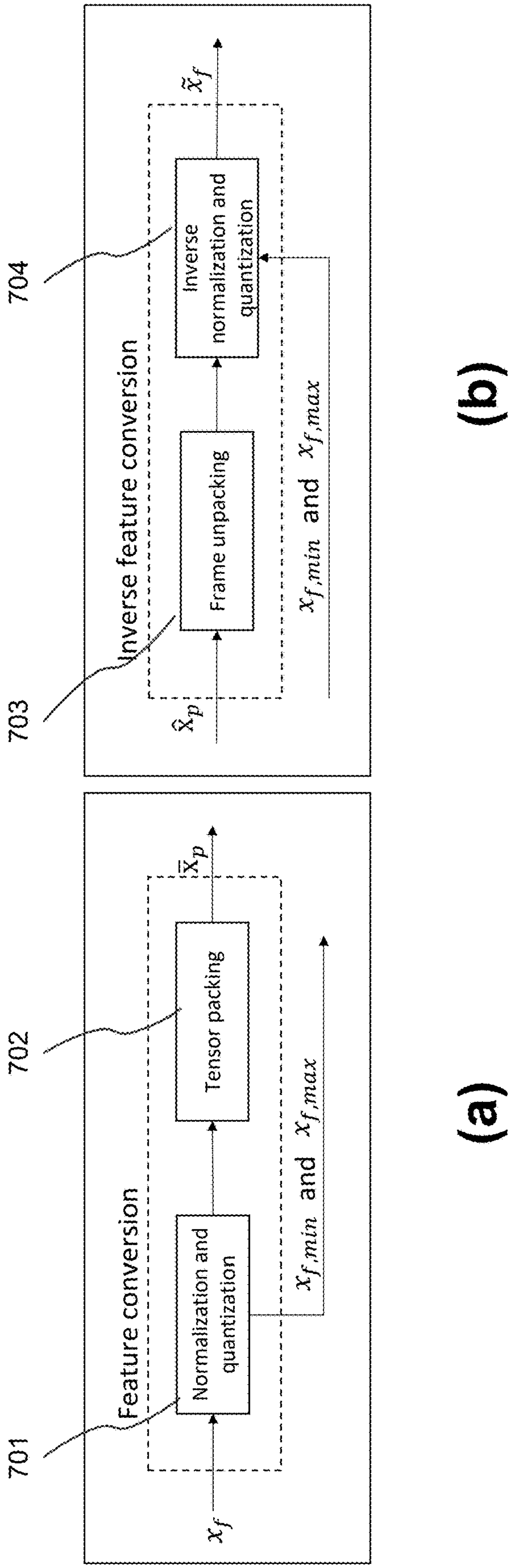
FIG. 7 illustrates a block diagram of a current feature conversion (a) and inverse feature conversion (b) process in FCM.

FIG. 7 illustrates a block diagram of a current feature conversion (a) and inverse feature conversion (b) process in FCM. Indeed, to utilize conventional standard video codecs to encode the reduced feature tensor $x_f$ in 3 dimensions, a feature conversion module conducts reshaping 3D tensors into 2D frames, followed by quantization. The order between the two modules: "normalization and quantization" 701 and "tensor packing" 702 in the feature conversion and "unpacking" 703 and "inverse normalization and quantization" 704 in the inverse feature conversion may be swaped. For each input feature tensor $x_f$ reduced by the reduction module 600 of FIG. 6, the minimum and maximum values of the feature tensors, $x_{f,min}$ and $x_{f,max}$ are extracted and used to normalize the feature values between 0 and 1 as follows:

$$x'_f = \max\left(\min\left(\frac{x_f - x_{f,min}}{x_{f,max} - x_{f,min}}, 0\right), 1\right)$$

n-bit uniform quantization is then performed to represent the features in n-bit integer values to code with the associated standard codec:

$$\bar{x}_f = \text{round}(x'_f \times (2^n - 1))$$

where round( ) is the rounding operation to the nearest integer value.

Figure 8:
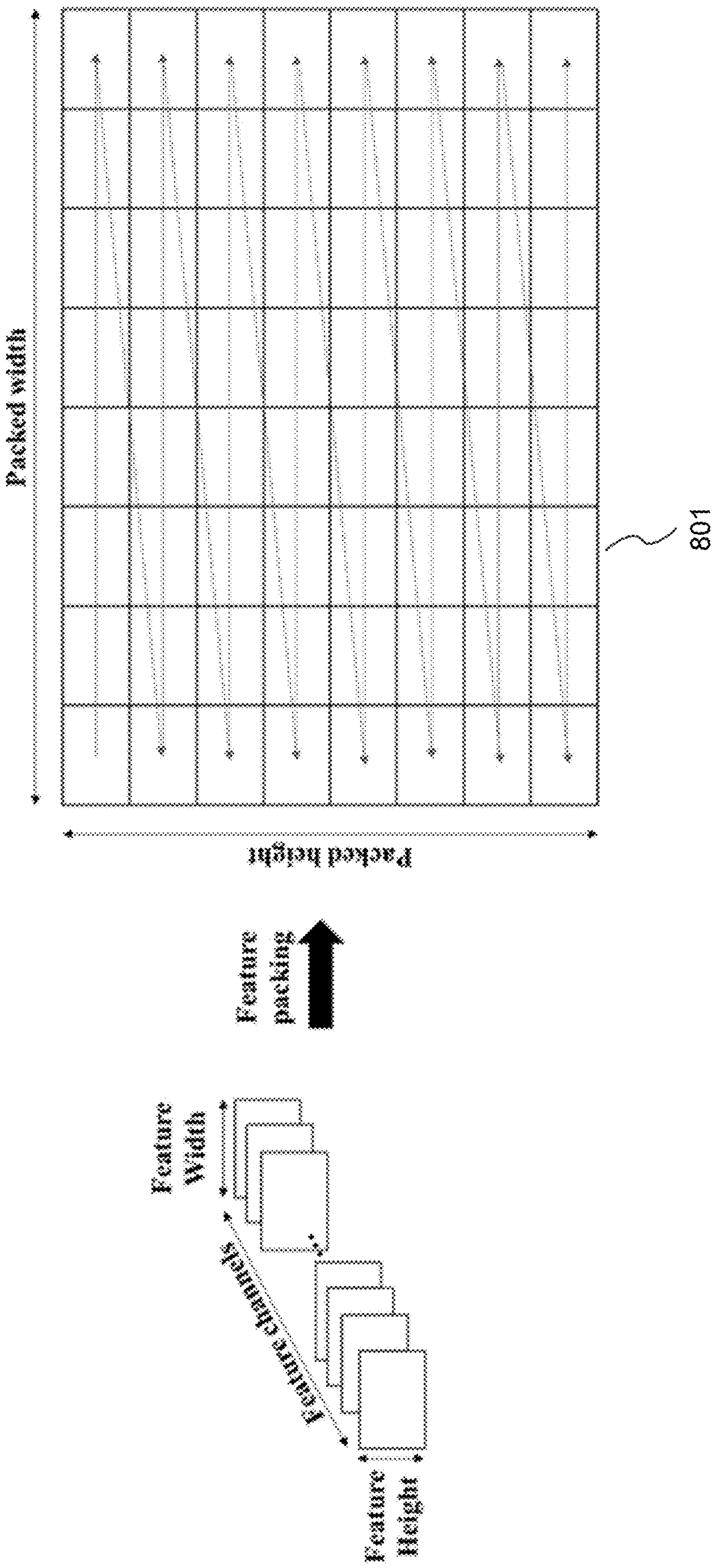
FIG. 8 illustrates an example of feature channels tiled into a packed frame.

FIG. 8 illustrates an example of feature channels tiled into a packed frame. For the spatial feature packing, the frame resolution $H_p$ and $W_p$ is computed such that the shape of the packed frame become wide rectangular as much as possible by which $C_f$ is divided properly in width and height and multiplied by $W_f$ and $H_f$, respectively. The final packed frame 801 as shown in FIG. 8 corresponds to $x_p \in \mathbb{R}^{H_p \times W_p}$ out of $C_f$. After the conversion process, the frame $\bar{x}_p$ represented in n-bit integer is fed into the standard video codec and all the necessary information such as $x_{f,min}$ $x_{f,max}$, feature tensor sizes, etc. are coded and added to the bitstream. The decoding process corresponds to the inverse scaling and packing operations of the encoder in inverse order, using the parsed information from the bitstream.

In the latest FCTM development, a temporal resampling method was proposed that temporally downsamples input feature tensors at the encoder side. In the following of the document, we call "set of tensors" or "picture" the plurality of input feature tensors for a given time instant, corresponding to a picture of a video. The skipped sets of feature tensors are estimated from their respective neighboring two sets of reconstructed feature tensors using bi-linear interpolation at the decoder side.

Figure 9:
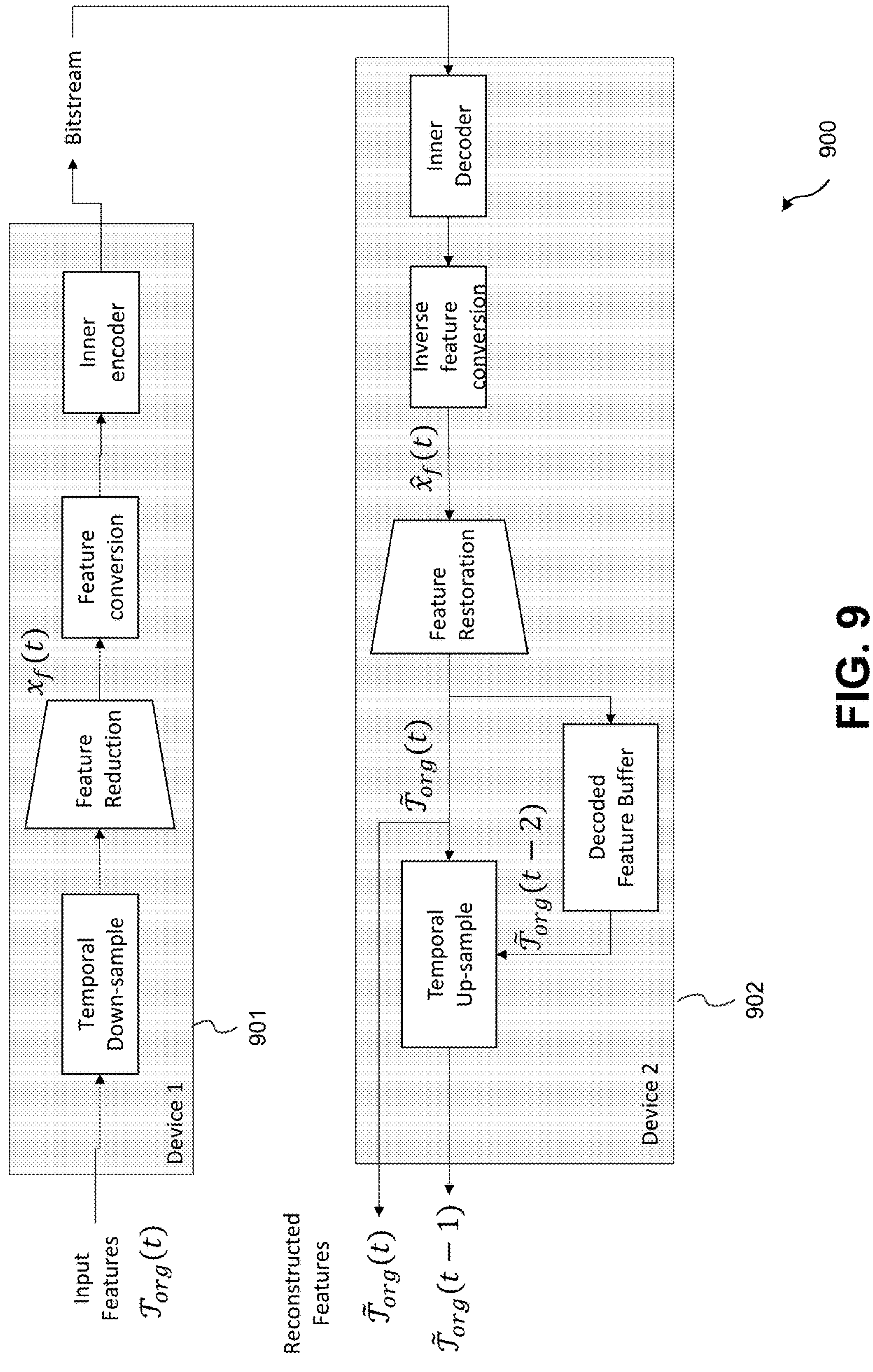
FIG. 9 illustrates a block diagram of a pipeline in Feature Coding for Machines (FCM) with a temporal resampling within which aspects of the present embodiments may be implemented.

FIG. 9 illustrates a block diagram of a pipeline in Feature Coding for Machines (FCM) with a temporal resampling within which aspects of the present embodiments may be implemented. When temporal resampling is enabled at sequence level, the resampling process is applied to the input at the encoder side 901 such that every other set of input feature tensors is dropped. Since the encoder codes and tranfers every other set of the input feature tensor(s), the dropped sets of the input feature tensor(s) have to be derived at the decoder side 902. To estimate the skipped sets of feature tensors corresponding to time t at the decoder side, the set of reconstructed feature tensor(s) a time t−2 $\tilde{\mathcal{T}}_{org}$ (t−2) is buffered in the decoded feature buffer to be used as reference together with the current set of the reconstructed feature tensor(s) $\tilde{\mathcal{T}}_{org}$ (t) at time t. Therefore, the dropped set of the feature tensor(s) $\tilde{\mathcal{T}}_{org}$ (t−1) at time t−1 can be estimated using both past and future neighboring sets of the reconstructed feature tensors by bilinear interpolation operation.

Figure 10A:
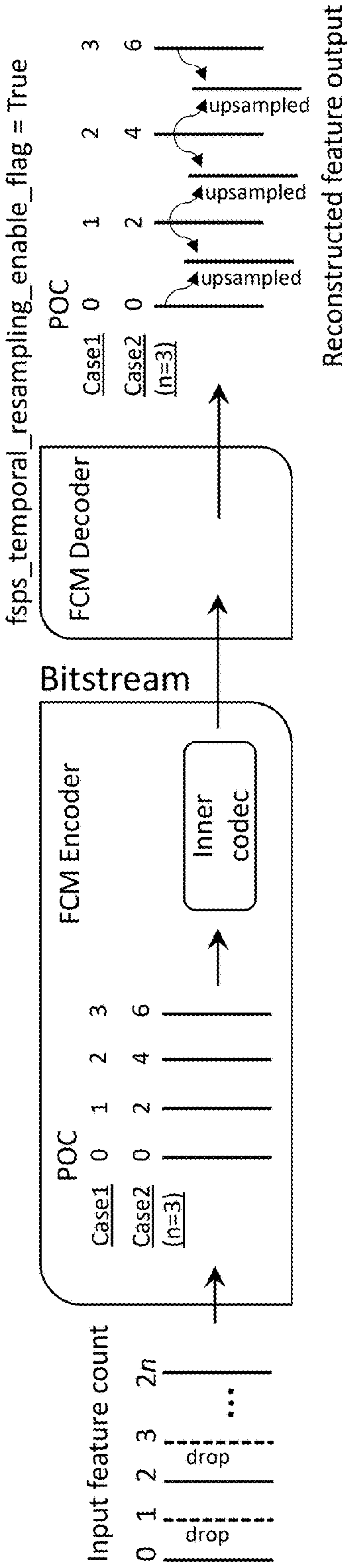
FIGS. 10A, 10B, 10C, and 10D present various scenarios of coding sequences where the temporal resampling is enabled and to which aspects of the present embodiments may be implemented.

FIGS. 10A, 10B, 10C, and 10D present various scenarios of coding sequences where the temporal resampling is enabled and to which aspects of the present embodiments may be implemented. For instance, FIG. 10A shows the scenario where the temporal down-sampling performs at every other set of the input feature tensors and the total number of sets of the input feature tensors is an odd number. An encoder may sequentially assign the picture order count (POC) from 0 increased by 1 for the temporally down-sampled input (i.e., Case 1) or may assign the POC with the original count of the input pictures (i.e., Case 2).

At the decoder side, in Case 2 when the difference between POCs of two consecutive pictures is always equal to 2 with the temporal resampling enabled, the existing method performs bilinear interpolation to estimate the dropped pictures halfway between the decoded pictures at time t−2 and t. In Case 1 where the decoded POCs are increased by 1 with the temporal resampling enabled, the temporal upsampling may be performed similarly as Case 2, but it may not be able to differentiate Case 1 from Case 3, depicted in FIG. 10B, using the existing signalling mechanism for the temporal resampling method, since nothing tells the decoder that the last transmitted picture corresponds to POC=5, instead of 6.

Figure 10B:
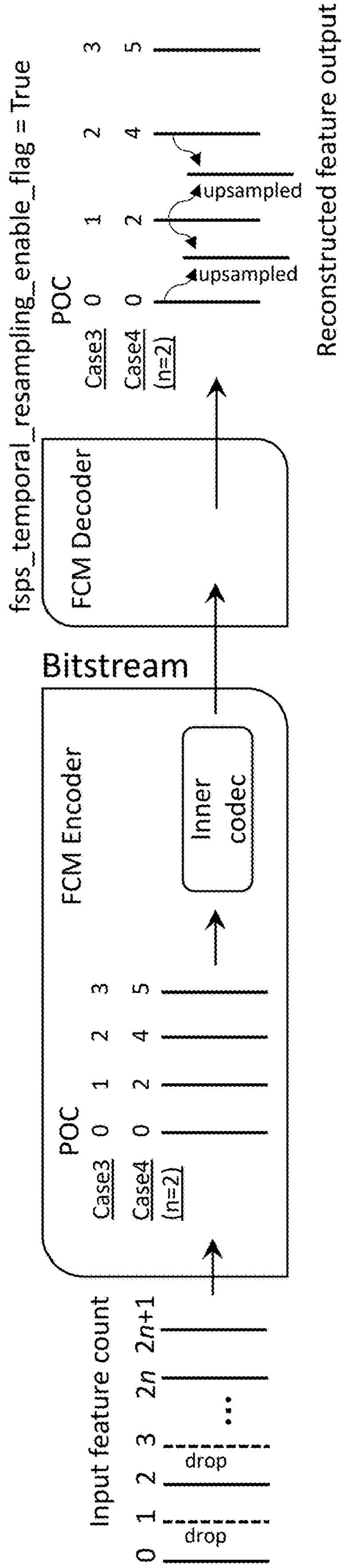

FIG. 10B shows the scenario where the temporal down-sampling is performed at every other picture and the total number of pictures is an even number. Hence the encoder may not drop the last pictures: 2n-th and 2n+1-th in FIG. 10B. The encoder may sequentially assign the picture order count (POC) from 0 increased by 1 for the temporally down-sampled input (i.e., Case 3) or may assign the POC with the original counts of the input as they are obtained in order (i.e., Case 4).

At the decoder side, in Case 4 when the difference between POCs of two consecutive sets of reconstructed pictures is equal to 2 with the temporal resampling enabled except for the last set of reconstructed pictures with POC 5, the existing method performs bilinear interpolation to estimate the dropped pictures at halfway between the two sets of the reconstructed feature tensors. Since the difference between POC 4 and POC 5 is equal to 1, the decoder should not perform the upsampling process with the two sets of reconstructed feature tensors although the temporal resampling is enabled. For Case 3 of the decoded POCs increased by 1 with the temporal resampling enabled, however, it is hardly identified by the existing method if the upsampling process should conduct between the two sets of reconstructed feature tensors with POC 2 and POC 3 or not compared with Case 1 in FIG. 10A.

Figure 10C:
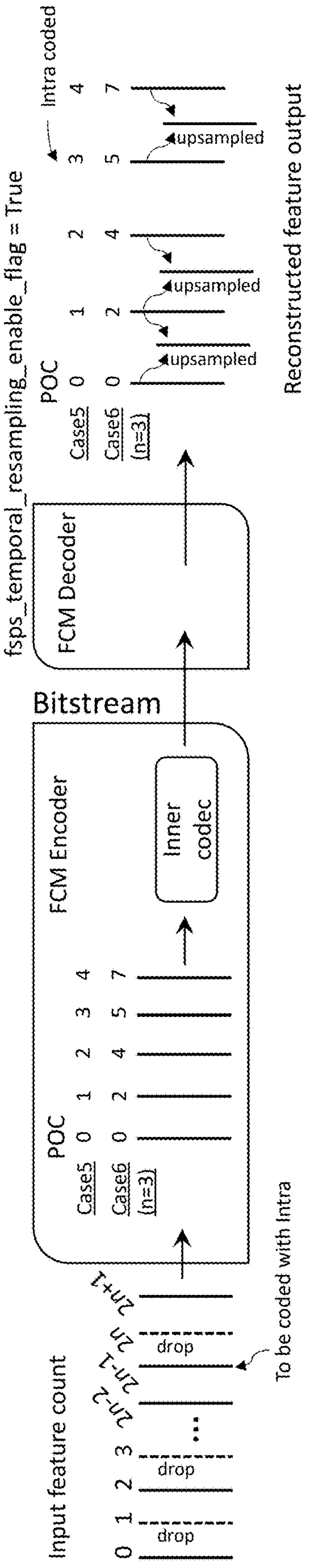

FIG. 10C shows the scenario where the temporal down-sampling performs at every other set of the input feature tensors while there is an input to be coded with intra frame for example because of the scene change at 2n−1-th input feature. Hence the encoder should not drop the 2n−1-th input feature but continue dropping every other set of the input feature tensors from the 2n-th input feature onwards. The encoder may sequentially assign the picture order count (POC) from 0 increased by 1 for the temporally down-sampled input (i.e., Case 5) or may assign the POC with the original counts of the input as they are obtained in order (i.e., Case 6).

At the decoder side, with Case 6 when the difference between POCs of two consecutive sets of reconstructed feature tensors is equal to 2 with the temporal resampling enabled, the existing method performs bilinear interpolation to estimate the dropped set of feature tensors at halfway between the two sets of the reconstructed feature tensors. Since the difference between POC 4 and POC 5 is equal to 1, the decoder should not perform the upsampling process with the two sets of reconstructed feature tensors although the temporal resampling is enabled. For Case 5 of the decoded POCs increased by 1 with the temporal resampling enabled, unlike Case 3, Case 5 can be differentiated from Case 1 because the set of reconstructed feature tensors with POC 3 is coded with Intra frame. However, Case 5 is hardly differentiated from Case 7 in FIG. 10D where the set of reconstructed feature tensors with POC 3 is coded with Intra frame while allowing to be referenced because of the open GOP structure.

Figure 10D:
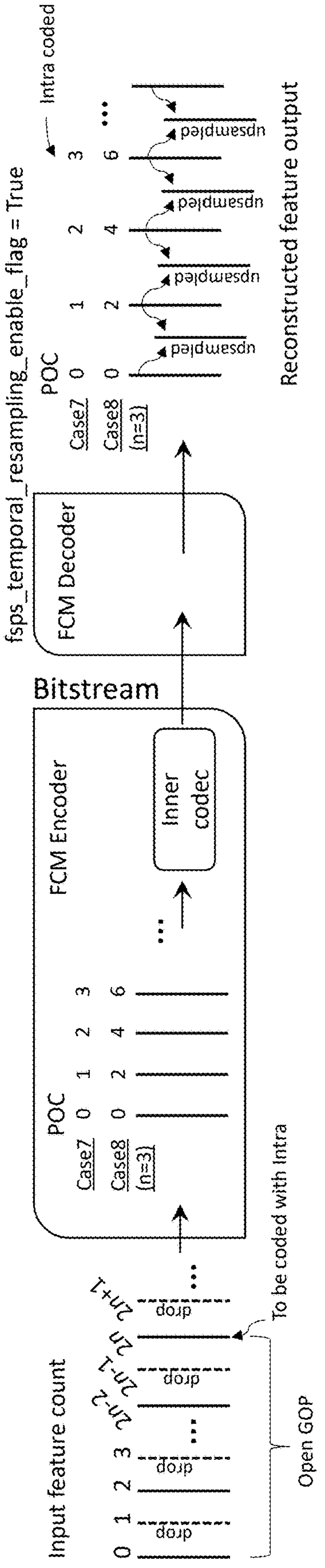
Figure 11A:
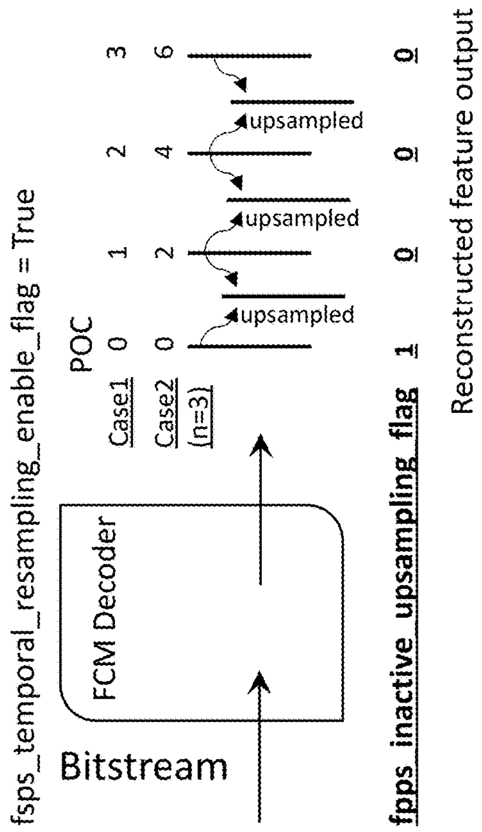
FIGS. 11A, 11B, 11C, and 11D present various cases of coding sequence where temporal resampling is enabled with the signalling according to one or more embodiments.
Figure 11B:
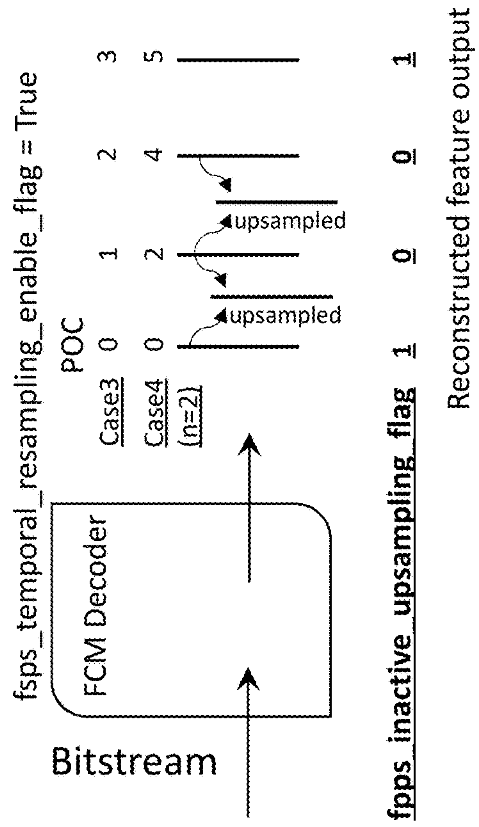
Figure 11C:
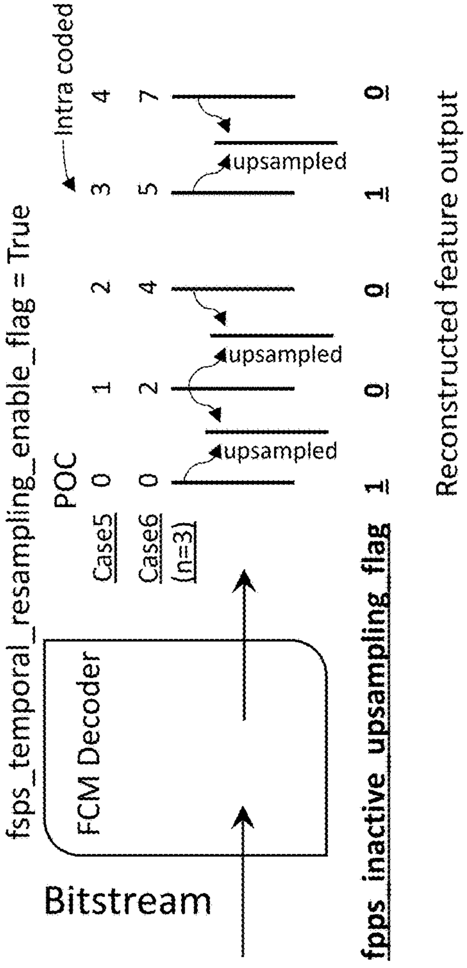
Figure 11D:
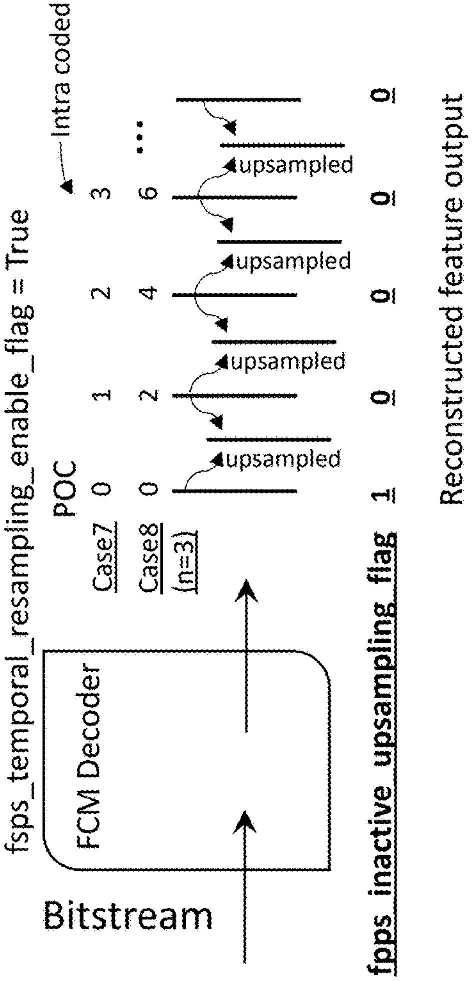

FIG. 10D shows the scenario where the temporal down-sampling performs at every other set of the input feature tensors while there is a set of feature tensors coded with intra frame at every intra period with the open GOP structure. Hence the encoder may drop the 2n−1-th input feature and continue the temporal downsampling process. The encoder may sequentially assign the picture order count (POC) from 0 increased by 1 for the temporally down-sampled input (i.e., Case 7) or may assign the POCs with the original counts of the input as they are obtained in order (i.e., Case 8).

At the decoder side, with Case 8 when the difference between POCs of two consecutive sets of reconstructed feature tensors is equal to 2 with the temporal resampling enabled, the existing method performs bilinear interpolation to estimate the dropped set of feature tensors at halfway between the two sets of the reconstructed feature tensors. For Case 7 of the decoded POCs increased by 1 with the temporal resampling enabled, still the upsampling should be conducted between the reconstructed features with POC 2 and POC 3 although POC 3 is coded with intra, whereas in Case 5 the decoder should not conduct the upsampling between the reconstructed features with POC 2 and POC 3.

As discussed above with various scenarios depicted in FIG. 10, keeping the original POC count till to the inner codec may clear the uncertainty on whether upsampling or not reconstructed features at the decoder as illustrated with Case 2, 4, 6 and 8. However, it may be impractical to constrain the inner encoder behavior in numbering POCs with original POC count before resampling. Meanwhile, reassigning POCs as the sequence of input is downsampled may raise the uncertainty on the issues, i.e., Case 1, 3, 5, and 7. With the existing signalling for the temporal resampling and without constraint on picture order numbering, there is one or more cases where a FCM decoder may incorrectly conduct temporal upsampling due to the lack of information to differentiate, for instance Case 1 from Case 3. In addition to that, there is also a case that a FCM decoder may necessarily require lists of reference structure from Inner codec to differentiate Case 5 from Case 7. Even, if there is a FCM encoder that only assigns POCs with the original counts of the input as they are obtained in order and keeps the original counts till being coded with Inner codec, it still may or may not be able to identify the cases of selectively performing the temporal upsampling at the decoder when the temporal resampling is enabled beyond the example scenarios depicted in FIG. 10. To overcome this latest issue, a method was proposed that consists in coding the total number of the sets of input feature tensors when the temporal resampling is enabled at sequence level in order to identify the end of sequence. However, indicating the total number of the sets of input feature tensors is not satisfactory due to the impracticality of determining the total length of an input in streaming scenarios.

Thus, existing temporal resampling method fails to correctly perform the upsampling process at the decoder side since there is no mechanism to identify cases where the up-sampling process should not be conducted albeit the temporal resampling enabled, e.g. when a key picture, random access point, needs to be inserted at a time instant when the picture (i.e., set of feature tensors) was supposed to be dropped or when reaching the end of a sequence.

Accordingly, the present principles propose methods and apparatus that selectively activate the temporal upsampling process at the decoder based on an indication for temporal upsampling a set of feature tensors at picture level. According to various cases, the indication for temporal upsampling is obtained from an extra flag signalled at picture level when the temporal resampling is enabled or derived from some decoding information, e.g., end of sequence, intra frame, IDR . . . Advantageously, the disclosed methods and apparatus address the various issues at the decoder described above at a reduced signalling cost, make the decoding process simpler and resilient to various encoding policy for POCs.

FIGS. 11A, 11B, 11C, and 11D present various cases of coding sequence where temporal resampling is enabled with the signalling according to one or more embodiments. According to the present principles, the extra flag fpps_inactive_upsampling_flag explicitly indicates the disabling of the upsampling process at the decoder as shown in FIGS. 11A, 11B, 11C, and 11D. Regardless of the POC numbering and the identification of Intra coding, the upsampling is performed between the previously decoded picture and the current picture when the current fpps_inactive_upsampling_flag is equal to 0 while fsps_temporal_resampling_enable_flag is equal to 1. Reversely, the upsampling not is performed when the current fpps_inactive_upsampling_flag is equal to 0 or when fsps_temporal_resampling_enable_flag is equal to 0. The names and values of the proposed signaling are non-limiting examples and may be adapted within the scope of the present principles.

Besides, one may avoid signalling fpps_inactive_upsampling_flag when the POC is equal to 0 or for specific Network Abstraction Layer type (nal_type) such as instantaneous decoding refresh (IDR) picture that may be the first decoding picture in decoding process for a coded video sequence. Therefore, in the following generic embodiments are disclosed without or with general constraints on the signalling of the extra flag fpps_inactive_upsampling_flag, followed by various embodiments where conditional signalling is explicitly disclosed.

Figure 12:
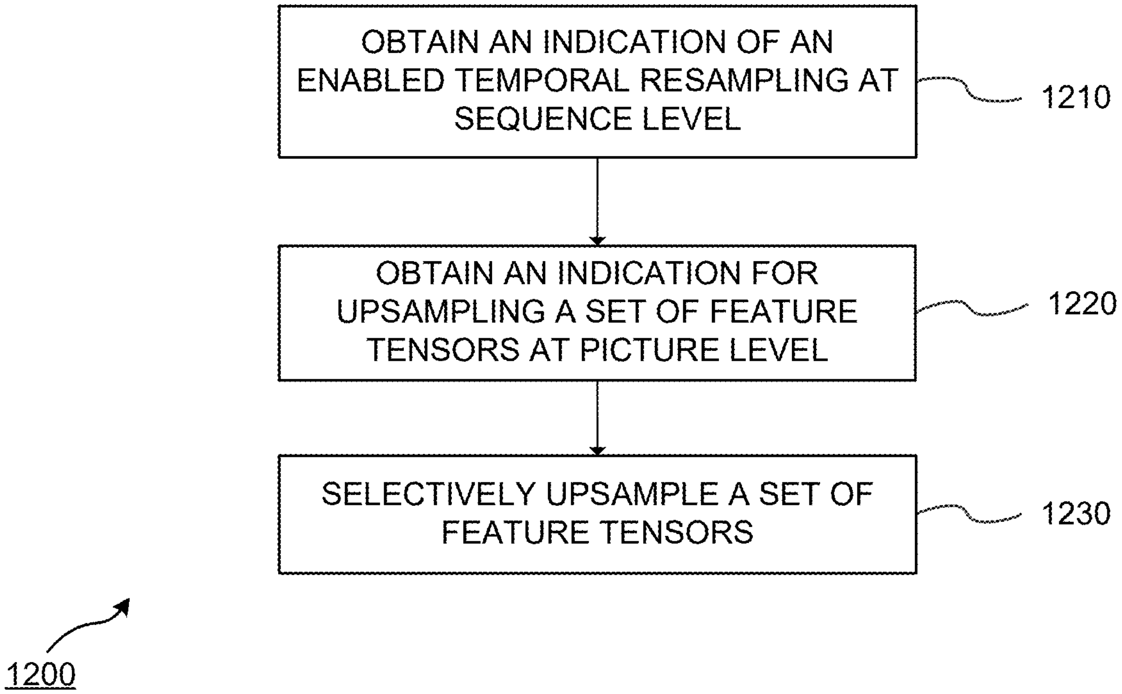
FIG. 12 illustrates a block diagram of a decoding method with the signalling of a temporal upsampling indication at picture level according to an embodiment.

FIG. 12 illustrates a block diagram of a decoding method with the signalling of a temporal upsampling indication at picture level according to an embodiment. The method 1200 of FIG. 12 may be implemented in the device 302 of FIG. 3 or 902 of FIG. 9. For the sake of conciseness, only the steps related to enabling of the upsampling at the decoder side are described with FIG. 12. In a step 1210, an indication of an enabling of a temporal resampling of at least one set of feature tensors of a video sequence is obtained. As previously described, a set of feature tensors may be representative of data characteristics of a picture, for instance used in NN vision processing tasks. Besides, a set of feature tensors, after various feature reduction, normalization and quantization processes, may be packed into a picture. A plurality of set of feature tensors may constitute a sequence of pictures or video sequence. As described hereafter with an example of data syntax, the indication of an enabling of a temporal resampling of at least one set of feature tensors may be signalled as a syntax element fsps_temporal_resampling_enable_flag at sequence level in a Feature Sequence Parameter Set FSPS. The flag fsps_temporal_resampling_enable_flag selectively enables or disables the resampling of the sets of feature tensors at the sequence level. In a step 1220, an indication for estimating an upsampled set of feature tensors is obtained at picture level. The indication for estimating an upsampled set of feature tensors selectively enables or disables at picture level a temporal upsampling of a skipped set of feature tensors from interpolation between a previous set of reconstructed feature tensors and a current set of reconstructed feature tensors. As described hereafter with various examples for processing data syntax, an indication for estimating an upsampled set of feature tensors may be signalled as a syntax element fpps_inactive_upsampling_flag at picture level in Feature Picture Parameter Set FPPS. Advantageously, to avoid redundant signalling, the syntax element fpps_inactive_upsampling_flag is signalled only when the indication may not be derived from the context of the decoding, such as whether temporal resampling is enabled for the sequence, whether the current frame is intra coded, or at the end of sequence. In the other cases, the indication for estimating an upsampled set of feature tensors at picture level may be derived and set to active (a frame was skipped at the encoding and upsampling is performed) or inactive (no skipped frame). Then, in a step 1230, the upsampling of a set of feature tensors is selectively activated or deactivated at the picture level using the related indication. When activated, a upsampled a set of feature tensors is generated using an interpolation between a previous set of reconstructed feature tensors and a current set of reconstructed feature tensors, for instance using bi-linear interpolation. The previous set of reconstructed feature tensors, the upsampled set of feature tensors and the current set of reconstructed feature tensors are part of the at least one decoded set of feature tensors, thus performing the decoding of the at least one set of feature tensors of the video sequence based on the indication for estimating an upsampled set of feature tensors.

Figure 13:
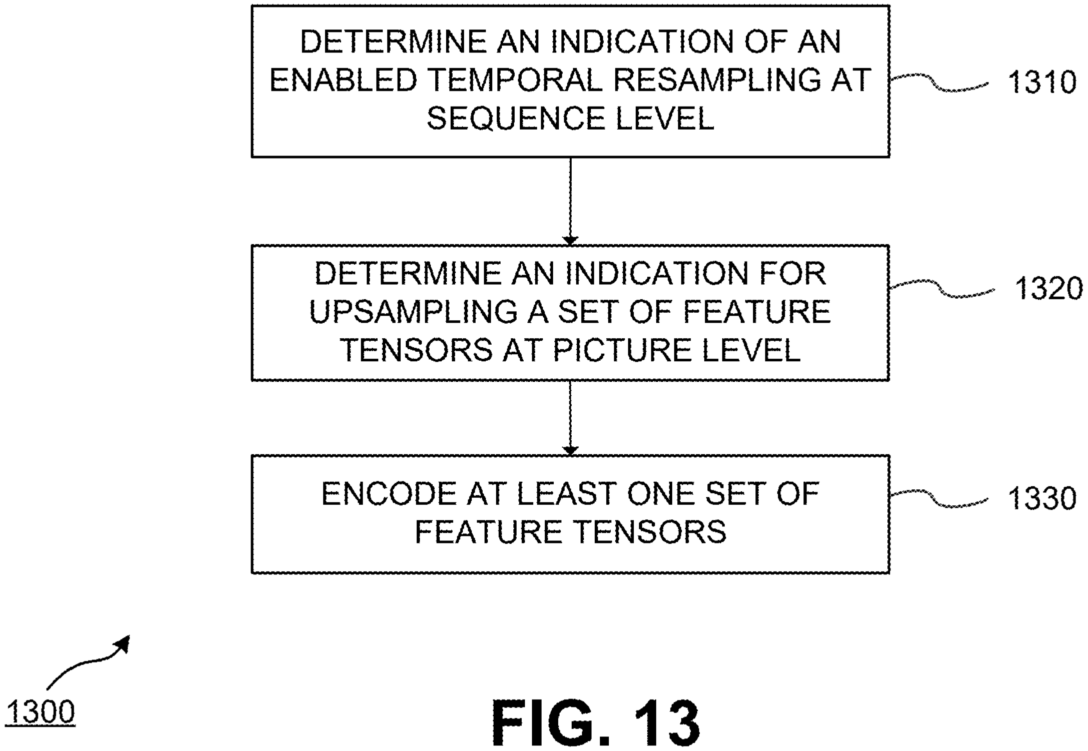
FIG. 13 illustrates a block diagram of an encoding method with the signalling of a temporal upsampling indication at picture level according to an embodiment.

FIG. 13 illustrates a block diagram of an encoding method with the signalling of a temporal upsampling indication at picture level according to an embodiment. The method 1300 of FIG. 13 corresponds to the decoding method 1200 of FIG. 12. The method 1300 of FIG. 13 may be implemented in the device 301 of FIG. 3 or 901 of FIG. 9. For the sake of conciseness, only the steps related to encoding of the syntax element selectively enabling or disabling resampling at sequence level or picture level are described here. In a step 1310, an encoder may obtain or determine an indication of whether a temporal resampling of at least one set of feature tensors of a video sequence is enabled. For instance, the indication is encoded as a syntax element fsps_temporal_resampling_enable_flag relative to enabling of a temporal resampling of at least one set of feature tensors at the level of a Feature Sequence Parameter Set (FSPS). Besides, in a step 1320, an encoder may obtain or determine, at picture level, an indication of whether activating an estimating of an upsampled set of feature tensors between a previous set of reconstructed feature tensors and a current set of reconstructed feature tensors. For instance, the indication may be encoded as a syntax element fpps_inactive_upsampling_flag related to activating or deactivating an estimating of an upsampled set of feature tensors between a previous set of reconstructed feature tensors at the level of a Feature Picture Parameter Set FPPS associated with the current set of feature tensors. Besides, the current set of feature tensors is encoded into a bitstream comprising coded data representative of the at least one set of feature tensors of the video sequence. Advantageously, an encoder may or may not retain the POCs with the original counts of the input as they are obtained in order, as the methods of FIG. 12 or FIG. 13 is independent on the difference between two consecutive POCs to enable the temporal upsampling between two sets of reconstructed feature tensors. Instead, a flag selectively enabling the temporal upsampling at the decoder side is explicitly signalled at picture level whenever needed.

In the following various embodiments, for data syntax and its processing is described that may be used in the method 1200 of FIG. 12 or method 1300 of FIG. 13.

Table 1 shows an example of syntax table for Feature Sequence Parameter Set FSPS where a flag fps_temporal_resampling_enable_flag (highlighted in italic, underlined in Table 1) is signaled to enable the temporal upsampling process at decoder as it may be described in a version of MPEG FCM specification.

TABLE 1

Existing syntax table for feature sequence parameter set (FSPS)

| | Descriptor |
|---|---|
| feature_sequence_parameter_set_rbsp ( ) { | |
| **fsps_feature_sequence_parameter_set_id** | |
| **fsps_number_of_original_feature_layers** | |
| for (i = 0; i <= fsps_number_of_original_feature_layers; i++) { | |
| **fsps_number_of_original_feature_samples_in_width[i]** | |
| **fsps_number_of_original_feature_samples_in_height[i]** | |
| **fsps_number_of_original_feature_channels[i]** | |
| } | |
| ... | |
| ... | |
| <u>***fsps***_temporal_resampling_enable_flag</u> | <u>***u*(*1*)**</u> |
| } | |

The simplest way for both decoding and parsing process of the proposed method is to signal the extra flag "inactive_upsampling_flag" at picture level only when fsps_temporal_resampling_enable_flag is equal to 1, i.e., True, as shown in Table 2 (modification highlighted in italic, underlines in Table 2).

TABLE 2

Proposed syntax table for feature picture parameter set (FPPS)

| | Descriptor |
|---|---|
| feature_picture_parameter_set_rbsp( ) { | |
| **fpps_feature_picture_parameter_set_id** | |
| **fpps_feature_sequence_parameter_set_id** | |
| ... | |
| if (fsps_temporal_resampling_enable_flag) { | |
| <u>***fpps***_inactive_upsampling_flag</u> | <u>***u*(*1*)**</u> |
| } | |
| } | |

fpps_inactive_upsampling_flag inactivates the temporal upsampling process when the fpps_inactive_upsampling_flag is set to 1 while fsps_temporal_resampling_enable_flag is equal to 1. When fpps_inactive_upsampling_flag is set to 0 and fsps_temporal_resampling_enable_flag is equal to 1, the temporal upsampling process performs to estimate the intermediate set of feature tensors between the previous and current set of reconstructed feature tensors. When fsps_temporal_resampling_enable_flag is equal to 0, fpps_inactive_upsampling_flag is not signalled.

Figure 14:
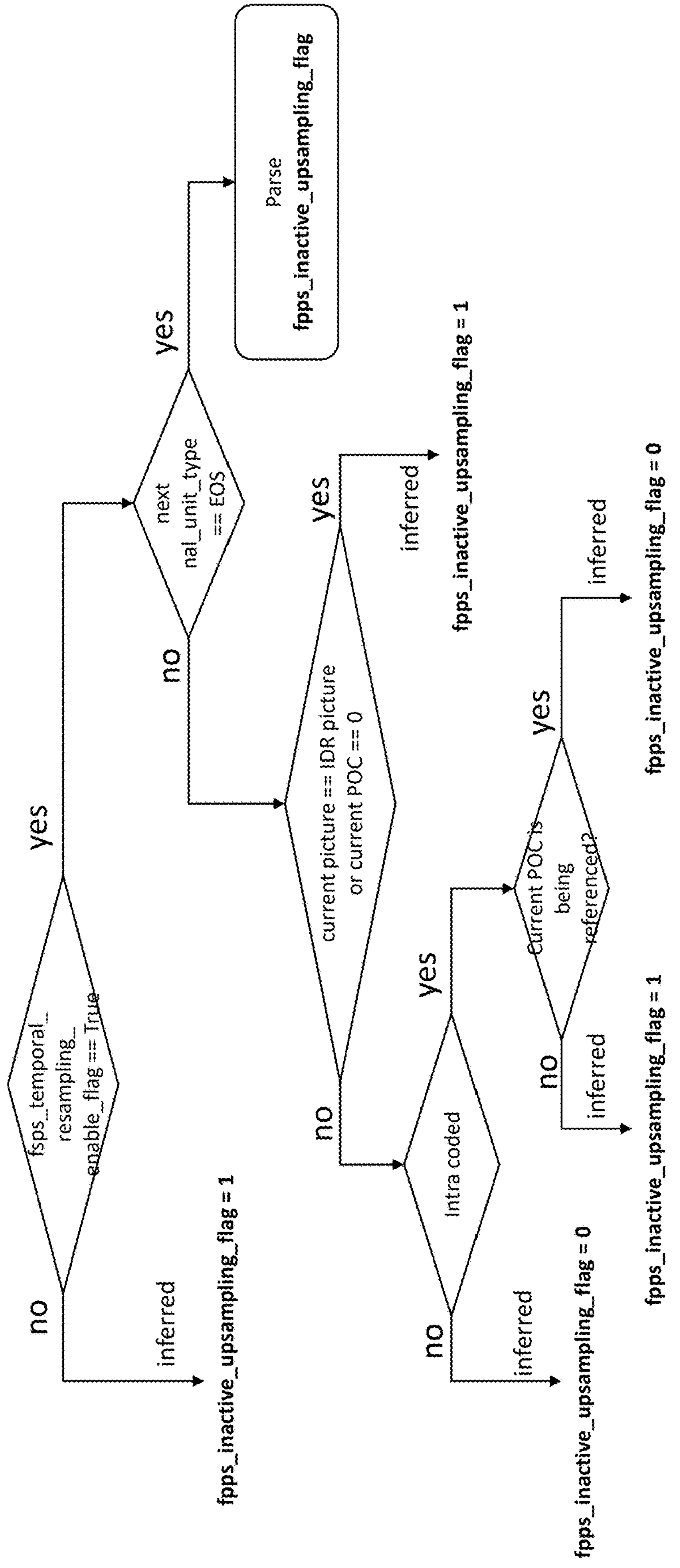
FIG. 14 and FIG. 15 illustrate a block diagram of a method for obtaining a temporal upsampling indication at picture level according to one or more embodiments.

FIG. 14 illustrates a block diagram of a method for obtaining a temporal upsampling indication at picture level according to one or more embodiments. Various cases of temporal resampling method with the proposed fpps_inactive_upsampling_flag that explicitly indicates the disabling of the upsampling process at the decoder are shown in FIG. 14 where the flag may be parsing from a syntax element of derived from information of the bitstream. Regardless of the POC numbering and the identification of Intra coding, the upsampling may be performed between the previously decoded picture and the current picture when the current fpps_inactive_upsampling_flag is equal to 0 while fsps_temporal_resampling_enable_flag is equal to 1.

Advantageously, the signalling fpps_inactive_upsampling_flag is avoided when the POC is equal to 0 or for specific Network Abstraction Layer type (nal_type) such as instantaneous decoding refresh (IDR) picture that may be the first decoding picture in decoding process for a coded video sequence. With this condition, the related syntax in Feature Picture Parameter Set may be modified (in italic, undelined) as shown in Table 2.

TABLE 3

Proposed syntax table conditioned on poc and current nal_unit_type for feature picture parameter set (FPPS)

| | Descriptor |
|---|---|
| feature_picture_parameter_set_rbsp( ) { | |
| **fpps_feature_picture_parameter_set_id** | |
| **fpps_feature_sequence_parameter_set_id** | |
| ... | |
| if (fsps_temporal_resampling_enable_flag) { | |
| <u>*if (poc != 0 and current nal_unit_type != IDR picture) {*</u> | |
| <u>***fpps***_inactive_upsampling_flag</u> | <u>***u*(*1*)**</u> |
| } | |
| } | |
| } | |

When POC is equal to 0 or current_nal_unit_type specifies that the current coding picture is IDR picture. Therefore, fpps_inactive_upsampling_flag can be inferred to 1. It should be noted that standard codecs such as H.264/AVC, H.265/HEVC, and H.266/VVC include different syntax elements to indicate an IDR picture depending on the scenarios supported by each standard. For example, in AVC/H.264 the coded slice of an IDR picture is identified as such when the nal_unit_type is equal to 5. Meanwhile, the latest two standards: HEVC/H.265 and VVC/H.266 define two different types of nal_unit_type for IDR picture: IDR with random access decodable leading (IDR_W_RADL) picture and IDR with no leading pictures (IDR_N_LP). The condition on the nal_unit_type corresponding to an IDR in Table 3 may apply to both types or IDR_N_LP because IDR_N_LP tells there is no leading picture ahead of the current picture, whereas there still may exist a decodable leading picture referencing the intra coded current picture when the nal_unit_type is IDR_W_RADL.

Another embodiment could further reduce signalling a bit while decoding process may become more conditioned on previously decoded information and following nal_unit_type. Still, regardless of POC numbering, the upsampling may always happen so long as fsps_temporal_resampling_enable_flag enabled except for specific cases. Table 4 shows the modified syntax table with the proposed fpps_inactive_upsampling_flag conditioned on next nal_unit_type. fpps_inactive_upsampling_flag is only required to parse when the next nal_unit_type is the end of sequence (EOS) nal unit or it also could be conditioned on the end of bitstream (EOB) for instance. For the rest of cases, fpps_inactive_upsampling_flag shall be inferred by following the flow chart depicted in FIG. 14.

TABLE 4

Proposed syntax table conditioned on next nal_unit_type for feature picture parameter set (FPPS)

| | Descriptor |
|---|---|
| feature_picture_parameter_set_rbsp( ) { | |
| **fpps_feature_picture_parameter_set_id** | |
| **fpps_feature_sequence_parameter_set_id** | |
| ... | |
| if (fsps_temporal_resampling_enable_flag) { | |
| *if (next_nal_unit_type == EOS_NUT) {* | |
| ***fpps***_inactive_upsampling_flag | ***u(1)*** |
| } | |
| } | |
| } | |

As shown in FIG. 14, the temporal upsampling indication at picture level fpps_inactive_upsampling_flag may be inferred. When fsps_temporal_resampling_enable_flag is set to 0, then fpps_inactive_upsampling_flag is always set to 1. For the case where fsps_temporal_resampling_enable_flag=1, it is always looking for next nal_unit_type if it is EOS or it also could be EOB. When the next nal_unit_type is equal to either EOS or EOB, fpps_inactive_upsampling_flag is expected to be parsed (ie decoded) from a bitstream. When the next nal_unit_type is equal to neither EOS nor EOB, then current nal_unit_type is checked if it is IDR_NUT or current POC is equal to 0. If either of the conditions are True, fpps_inactive_upsampling_flag is inferred to 1. Otherwise, it is further checked the current feature is coded with intra. If it is coded with inter frame, fpps_inactive_upsampling_flag is inferred to 0. If the current feature is coded with intra but neither IDR picture nor POC==0, it should be checked if the current picture POC has been listed in reference list of previously coded pictures. When it has been included in the reference list, then fpps_inactive_upsampling_flag should be inferred to 0 otherwise 1. This condition may be detailed by identifying the current nal_unit_type such as IDR_W_RADL, IDR_N_LP, BLA_W_LP, BLA_W_RADL, etc. that may already inform the reference structure associated with the current intra coded picture.

Figure 15:
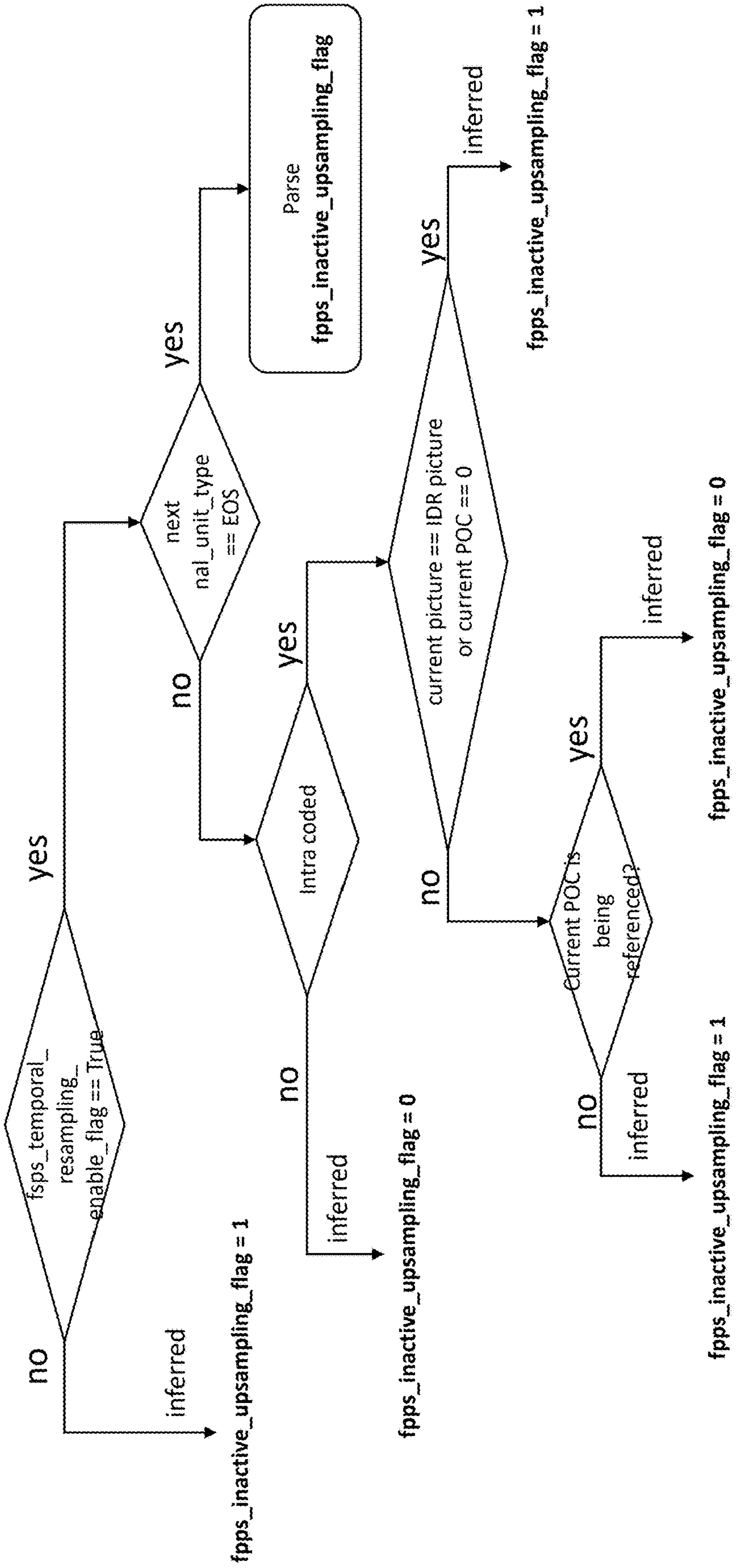

FIG. 15 illustrates a block diagram of a variant method for obtaining a temporal upsampling indication at picture level according to one or more embodiments where the flow charts of FIG. 14 is updated with different order of conditions.

One or more embodiments provide a computer program comprising instructions which when executed by one or more processors cause such processors to perform the encoding and/or decoding methods according to any of the embodiments described above. One or more embodiments also provide a computer readable storage medium having stored thereon instructions for encoding or decoding video data according to the methods described above.

One or more embodiments provide a computer readable storage medium having stored thereon video data generated according to the methods described above. One or more embodiments also provide a method and apparatus for transmitting or receiving video data generated according to the methods described above.

The embodiments described herein may be implemented in, for example, a method or a process, an apparatus, a software program, a data stream, or a signal. Even if only discussed in the context of a single form of implementation (e.g., as a method), the implementation of such features may also be implemented in other forms. An apparatus may be implemented in, for example, appropriate hardware, software, and firmware. Corresponding methods may be implemented in, for example, a processor.

The techniques described herein may be applied to various applications such as those involving the transmission of data for machine vision consumption. While these techniques may be described in the context of compressing intermediate data in a split-DNN model pipeline (e.g., a split-DNN model trained for machine vision tasks), those skilled in the art will appreciate that the techniques may be used for any type of data (e.g., intermediate data) associated with various learned models including, for example, vision, natural language processing, and/or multi-modal processing models.

Various numeric values are used in the present application. Such specific values are for example purposes and the embodiments described are not limited to these specific values. Various methods are described herein, and such methods comprise one or more steps or actions for achieving the described method. Unless a specific order of steps or actions is required for the proper operation of the method, the order and/or use of specific steps and/or actions may be modified or combined. Additionally, terms such as “first”, “second”, etc. may be used in various embodiments to modify an element, component, step, operation, etc., for example, a “first decoding” and a “second decoding”. Use of such terms does not imply an order to the operations unless specifically required.

The present disclosure may refer to “determining” various pieces of information. Determining information may include one or more of, for example, estimating, calculating, predicting, or retrieving (e.g., from memory) the information.

The present disclosure may refer to “accessing” various pieces of information. Accessing information may include one or more of, for example, receiving, retrieving (e.g., from memory), storing, moving, copying, calculating, determining, predicting, or estimating the information. Similarly, the present disclosure may refer to “receiving” various pieces of information. Receiving information may include one or more of, for example, accessing or retrieving (e.g., from memory) the information.

It is to be understood that use of any of the following “/”, “and/or”, and “at least one of” is intended to encompass all possible selections of listed items, taken either individually or in any combination thereof.

While specific embodiments have been described in the foregoing description in connection with the accompanying drawings, it should be understood that embodiments described herein are examples only and should not be taken as limiting the scope of the present disclosure or the following claims. Although features and elements are described herein in particular combinations, those of ordinary skill in the art will appreciate that such features or elements may be used alone or in any combination with the other features and elements. It is understood, therefore, that the overall teachings of the present disclosure are not limited to the particular embodiments, implementations, and examples disclosed herein, but are intended to cover variations, modifications, and alternatives as defined by the appended claims and any and all equivalents thereof.

What is claimed is:

1. A method for video decoding comprising:
obtaining, an indication of an enabling of a temporal resampling of at least one set of feature tensors of a video sequence;
obtaining an indication that selectively activates or deactivates an estimation of an upsampled set of feature tensors between a previous set of reconstructed feature tensors and a current set of reconstructed feature tensors, wherein said indication is set to inactive responsive to determining that the current set of feature tensors is a first set of feature tensors in the video sequence; and
decoding the at least one set of feature tensors of the video sequence based on the indication that selectively activates or deactivates an estimation of the upsampled set of feature tensors.

2. The method of claim 1, wherein:
responsive to determining that the temporal resampling is enabled for the video sequence, the indication that selectively activates or deactivates an estimation of the upsampled set of feature tensors between a previous set of reconstructed feature tensors is obtained by decoding a first syntax element from a Feature Picture Parameter Set FPPS associated with the current set of reconstructed feature tensors.

3. The method of claim 1, wherein:
responsive to determining that the temporal resampling is enabled for the video sequence, then responsive to determining that a next Network Abstraction Layer type unit type indicates an end of sequence, the indication that selectively activates or deactivates an estimation of the upsampled set of feature tensors between a previous set of reconstructed feature tensors is obtained by decoding a second syntax element from a Feature Picture Parameter Set FPPS.

4. The method of claim 1, wherein said indication is set to inactive without decoding a dedicated syntax element responsive to determining that the current set of feature tensors is a first set of feature tensors in the video sequence.

5. The method of claim 1, wherein:
responsive to determining that the temporal resampling is enabled for the video sequence and to determining that the current set of feature tensors is not an intra coded, the indication that selectively activates or deactivates an estimation of the upsampled set of feature tensors is set to active.

6. The method of claim 1, wherein the indication of an enabling of a temporal resampling of at least one set of feature tensors is obtained by decoding a first syntax element signaled from a Feature Sequence Parameter Set.

7. The method of claim 1, further comprising responsive to determining that the indication that selectively activates or deactivates an estimation of the upsampled set of feature tensors between a previous set of reconstructed feature tensors is active, interpolating an upsampled set of feature tensors from a previous set of reconstructed feature tensors and a current set of reconstructed feature tensors, wherein the previous set of reconstructed feature tensors, the upsampled set of feature tensors and the current set of reconstructed feature tensors are part of the at least one decoded set of feature tensors.

8. A device for video decoding, comprising:
a processor configured to:
obtain an indication of an enabling of a temporal resampling of at least one set of feature tensors of a video sequence;
obtain an indication that selectively activates or deactivates an estimation of an upsampled set of feature tensors between a previous set of reconstructed feature tensors and a current set of reconstructed feature tensors, wherein said indication is set to inactive responsive to determining that the current set of feature tensors is a first set of feature tensors in the video sequence; and
decode the at least one set of feature tensors of the video sequence based on the indication that selectively activates or deactivates an estimation of the upsampled set of feature tensors.

9. The device of claim 8, wherein the processor is further configured to:
determine that the temporal resampling is enabled for the video sequence; and
decode a first syntax element from a Feature Picture Parameter Set FPPS associated with the current set of reconstructed feature tensors to obtain the indication that selectively activates or deactivates an estimation of the upsampled set of feature tensors between a previous set of reconstructed feature tensors.

10. The device of claim 8, wherein the processor is further configured to:
determine that the temporal resampling is enabled for the video sequence; and
determine that a next Network Abstraction Layer type indicates an end of sequence; and
decode a first syntax element from a Feature Picture Parameter Set FPPS associated with the current set of reconstructed feature tensors to obtain the indication that selectively activates or deactivates an estimation of the an upsampled set of feature tensors between a previous set of reconstructed feature tensors.

11. The device of claim 8, wherein the processor is further configured to:
determine that the temporal resampling is enabled for the video sequence and that the current a current set of feature tensors is a first set of feature tensors in the video sequence; and
set the indication for estimating an upsampled set of feature tensors to inactive without decoding a dedicated syntax element.

12. The device of claim 8, wherein the processor is further configured to:
determine that the temporal resampling is enable for the video sequence and that the current set of feature tensors is not an intra coded; and set the indication that selectively activates or deactivates an estimation of the upsampled set of feature tensors to active.

13. The device of claim 8, wherein the processor is further configured to:

decode a first syntax element signaled from a Feature Sequence Parameter Set FSPS to obtain the indication of an enabling of a temporal resampling of at least one set of feature tensors.

14. The device of claim 8, wherein the processor is further configured to:

determine that the indication that selectively activates or deactivates an estimation of the upsampled set of feature tensors between a previous set of reconstructed feature tensors is active; and interpolate an upsampled set of feature tensors from a previous set of reconstructed feature tensors and a current set of reconstructed feature tensors, wherein the previous set of reconstructed feature tensors, the upsampled set of feature tensors and the current set of reconstructed feature tensors are part of the at least one decoded set of feature tensors.

15. A method for video encoding comprising:

determining an indication of an enabling of a temporal resampling of at least one set of feature tensors of a video sequence;

determining an indication that selectively activates or deactivates an estimation of an upsampled set of feature tensors between a previous set of reconstructed feature tensors and a current set of reconstructed feature tensors; and encoding the at least one set of feature tensors of the video sequence based on the indication that selectively activates or deactivates an estimation of the upsampled set of feature tensors.

16. The method of claim 15, wherein:

responsive to determining that the temporal resampling is enable for the video sequence, encoding a first syntax element including an indication that selectively activates or deactivates an estimation of the upsampled set of feature tensors between a previous set of reconstructed feature tensors into a Feature Picture Parameter Set FPPS associated with the current set of reconstructed feature tensors.

17. The method of claim 15, further comprising:

encoding a second syntax element including an indication of enabling of a temporal resampling of at least one set of feature tensors into a Feature Sequence Parameter Set FSPS.

18. A device for video encoding, comprising:

a processor configured to:

determine an indication of an enabling of a temporal resampling of at least one set of feature tensors of a video sequence;

determine an indication that selectively activates or deactivates an estimation of an upsampled set of feature tensors between a previous set of reconstructed feature tensors and a current set of reconstructed feature tensors, wherein said indication is set to inactive responsive to determining that the current set of feature tensors is a first set of feature tensors in the video sequence; and encode the at least one set of feature tensors of the video sequence based on the indication that selectively activates or deactivates an estimation of the upsampled set of feature tensors.

19. The device of claim 18, wherein the processor is further configured to:

determine that the temporal resampling is enabled for the video sequence; and encode a first syntax element including an indication that selectively activates or deactivates an estimation of the upsampled set of feature tensors between a previous set of reconstructed feature tensors into a Feature Picture Parameter Set FPPS associated with the current set of reconstructed feature tensors.

20. The device of claim 18, wherein the processor is further configured to:

encode a second syntax element including an indication of enabling of a temporal resampling of at least one set of feature tensors into a Feature Sequence Parameter Set FSPS.

* * * * *